(12) United States Patent
Liu et al.

(10) Patent No.: US 11,197,326 B2
(45) Date of Patent: Dec. 7, 2021

(54) METHOD AND DEVICE FOR RANDOM ACCESS

(71) Applicant: GUANGDONG OPPO MOBILE TELECOMMUNICATIONS CORP., LTD., Guangdong (CN)

(72) Inventors: Jianhua Liu, Guangdong (CN); Hua Xu, Ottawa (CA); Ning Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/476,030

(22) PCT Filed: Jan. 5, 2017

(86) PCT No.: PCT/CN2017/070329
§ 371 (c)(1),
(2) Date: Jul. 3, 2019

(87) PCT Pub. No.: WO2018/126417
PCT Pub. Date: Jul. 12, 2018

(65) Prior Publication Data
US 2019/0350005 A1 Nov. 14, 2019

(51) Int. Cl.
*H04W 74/08* (2009.01)
*H04W 68/00* (2009.01)
(Continued)

(52) U.S. Cl.
CPC ..... *H04W 74/0833* (2013.01); *H04W 68/005* (2013.01); *H04W 72/06* (2013.01); *H04W 72/085* (2013.01); *H04W 74/02* (2013.01)

(58) Field of Classification Search
CPC ........... H04W 74/0833; H04W 68/005; H04W 72/06; H04W 72/085; H04W 74/02; H04L 5/0048; H04L 5/0007
See application file for complete search history.

(56) References Cited

U.S. PATENT DOCUMENTS

2011/0310804 A1 12/2011 Beygzadeh
2012/0033613 A1 2/2012 Lin et al.
(Continued)

FOREIGN PATENT DOCUMENTS

CN 1617625 5/2005
CN 101453778 6/2009
(Continued)

OTHER PUBLICATIONS

FSIP, Office Action for RU Application No. 2019124442, dated May 13, 2020.
(Continued)

*Primary Examiner* — Pao Sinkantarakorn
*Assistant Examiner* — Kabir U Jahangir
(74) *Attorney, Agent, or Firm* — Hodgson Russ LLP

(57) ABSTRACT

A method for random access includes: determining, by a first device, a first basic parameter set used by a first message transmitted during a random access procedure; and transmitting, by the first device using the first basic parameter set, the first message to a second device, or receiving, by the first device using the first basic parameter set, the first message transmitted by the second device.

15 Claims, 4 Drawing Sheets

(51) Int. Cl.
*H04W 72/06* (2009.01)
*H04W 72/08* (2009.01)
*H04W 74/02* (2009.01)

(56) References Cited

U.S. PATENT DOCUMENTS

| | | | |
|---|---|---|---|
| 2013/0242730 A1 | 9/2013 | Pelletier et al. | |
| 2015/0146631 A1 | 5/2015 | Kim et al. | |
| 2016/0192420 A1 | 6/2016 | Kim et al. | |
| 2016/0286385 A1* | 9/2016 | Ryu | H04W 68/00 |
| 2016/0366704 A1* | 12/2016 | Lee | H04W 72/0413 |
| 2017/0019930 A1* | 1/2017 | Lee | H04W 72/0413 |
| 2017/0280481 A1* | 9/2017 | Stern-Berkowitz | H04W 74/0833 |
| 2017/0353976 A1* | 12/2017 | Yerramalli | H04L 5/0057 |
| 2018/0139778 A1* | 5/2018 | Chou | H04W 76/27 |
| 2019/0044782 A1* | 2/2019 | Zeng | H04L 27/2613 |
| 2019/0182872 A1* | 6/2019 | Chen | H04W 74/0833 |
| 2019/0356449 A1* | 11/2019 | Yoshimura | H04L 5/0053 |

FOREIGN PATENT DOCUMENTS

| | | |
|---|---|---|
| CN | 101523930 | 9/2009 |
| CN | 102387600 | 3/2012 |
| CN | 102572913 | 7/2012 |
| CN | 102695285 | 9/2012 |
| CN | 104540231 | 4/2015 |
| CN | 105874726 | 8/2016 |
| JP | 2010506508 | 2/2010 |
| JP | 2010183531 | 8/2010 |
| JP | 2016519554 | 6/2016 |
| JP | 2018514155 | 5/2018 |
| RU | 2450450 | 5/2012 |
| WO | 2015137632 | 9/2015 |
| WO | 2016025899 | 2/2016 |
| WO | 2016163126 | 10/2016 |

OTHER PUBLICATIONS

SIPO, First Office Action for CN Application No. 201780077058.8, dated Mar. 19, 2020.
Huawei et al. "Overview of 5G Frame Structure," 3GPP TSG RAN WG1 Meeting #84bis R1-162157, Apr. 2016, 6 pages.
Motorola Mobility "Random Access in NR," 3GPP TSG RAN WG1 Meeting #86bis R1-1609918, Oct. 2016, 3 pages.
WIPO, ISR for PCT/CN2017/070329, dated Sep. 29, 2017.
Ericsson, "Numerology for NR Random Access and Data," 3GPP TSG-RAN WG1 Meeting #87, R1-1611913, Nov. 2016, 2 pages.
Huawei et al., "Discussion on UE behavior on mixed numerology carrier," 3GPP TSG RAN WG1 Meeting #86bis, R1-1609425, Oct. 2016, 4 pages.
Huawei et al., "Initial Access with Multiple Numerologies," 3GPP TSG-RAN WG2 Meeting #96, R2-167574, Nov. 2016, 3 pages.
Huawei et al., "On numerology determination during initial access," 3GPP TSG RAN WG1 Meeting #87, R1-1611651, Nov. 2016, 3 pages.
Interdigital Communications, "System Access and Support for Different Numerologies," 3GPP TSG-RAN WG2 #96, R2-168592, Nov. 2016, 4 pages.
LG Electronics, "Discussion on Initial Access Procedure," 3GPP TSG RAN WG1 Meeting #87, R1-1611792, Nov. 2016, 5 pages.
EPO, Office Action for EP Application No. 17889876.3, dated Nov. 11, 2019.
IPI, Office Action for IN Application No. 201917029818, dated Oct. 27, 2020.
INAPI, Office Action for CL Application No. 201901850, dated Oct. 27, 2020.
SIPO, Second Office Action in CN Application 201780077058.8, dated Jun. 11, 2020.
CIPO, First Office Action in CA Application 3049281, dated Aug. 14, 2020.
NTT DOCOMO, ETRI, ZTE, "WF on Preamble Format Design," 3GPP TSG RAN WG1 Meeting #87, R1-1613169, Nov. 14, 2016, 4 pages.
JPO, Office Action for JP Application No. 2019-536946, dated Feb. 5, 2021.
TIPO, Office Action for TW Application No. 107100059, dated Apr. 30, 2021.
ISDEC, Office Action for CA Application No. 3049281, dated Jun. 14, 2021.
JPO, Office Action for JP Application No. 2019-536946, dated Sep. 3, 2021.
IPO, Office Action for IL Application No. 267852, dated Aug. 8, 2021.
EPO, Extended European Search Report for EP Application No. 21177419.5, dated Sep. 14, 2021.

\* cited by examiner

200

| 210 |
|---|
| Determine, by a first device, a first basic parameter set used by a first message transmitted in a random access procedure |

| 220 |
|---|
| The first device, using the first basic parameter set, transmits the first message to a second device or receives the first message transmitted by the second device |

METHOD AND DEVICE FOR RANDOM ACCESS

CROSS-REFERENCE TO RELATED APPLICATION

This application is a U.S. national phase application of International Application No. PCT/CN2017/070329, filed Jan. 5, 2017, the entire disclosure of which is incorporated herein by reference.

TECHNICAL FIELD

The present disclosure generally relates to the field of communication, and more particularly, to a method and a device for random access.

BACKGROUND

Random access is the most basic function that a cellular system should have, making it possible for a terminal device to establish a communication connection with a network. The success rate of random access depends on a fact whether a random access procedure can be successfully completed.

With the development of wireless communication technologies, the wireless environment is more complicated, and a more flexible random access procedure is required.

How to implement more flexible random access is a problem to be solved urgently.

SUMMARY

Embodiments of the present disclosure provide a method and a device for random access, which can implement flexible random access.

In a first aspect, there is provided a method for random access, which includes:

determining, by a first device, a first basic parameter set used by a first message transmitted during a random access procedure; and transmitting, by the first device using the first basic parameter set, the first message to a second device, or receiving, by the first device, the first message transmitted by the second device.

In combination with the first aspect, in a possible implementation manner thereof, the first message used for random access is a message transmitted during a 4-step random access procedure, or a message transmitted during a 2-step random access procedure.

In combination with the first aspect or any possible implementation manner thereof, in another possible implementation manner thereof, the first device is a terminal device, and the second device is an access network device; or the first device is an access network device, and the second device is a terminal device.

In combination with the first aspect or any possible implementation manner thereof, in another possible implementation manner thereof, the determining, by a first device, a first basic parameter set used by a first message transmitted during a random access procedure includes:

determining, by the first device, the first basic parameter set according to at least one of following information:

pre-configured multiple basic parameter sets;
a random function;
rank information of the terminal device;
a current link quality value between the terminal device and the access network device;
information on a location where the terminal device currently is;
time required for performing the random access procedure;
information on a service to be transmitted of the terminal device;
a reason for triggering the random access procedure;
a resource used when transmitting the first message;
a frequency band of a frequency domain resource used when transmitting the first message;
a basic parameter set supported by the terminal device;
a frequency band supported by the terminal device;
a random access mode used when performing the random access procedure;
information for indicating a basic parameter set carried in a historical message prior to the first message; and
a basic parameter set used by the historical message prior to the first message.

In combination with the first aspect or any possible implementation manner thereof, in another possible implementation manner thereof, the determining, by the first device, the first basic parameter set includes:

selecting, by the first device, the first basic parameter set from the pre-configured multiple basic parameter sets.

In combination with the first aspect or any possible implementation manner thereof, in another possible implementation manner thereof, the determining, by the first device, the first basic parameter set includes:

acquiring, by the first device, a first probability value based on the random function; and determining the first basic parameter set according to a first correspondence and the first probability value, wherein the first correspondence is used to indicate a correspondence between at least one probability range and at least one basic parameter set.

In combination with the first aspect or any possible implementation manner thereof, in another possible implementation manner thereof, the determining, by the first device, the first basic parameter set includes:

acquiring, by the first device, a second probability value based on the random function; and determining the first basic parameter set according to a second correspondence, the second probability value, and a rank indicated by the rank information of the terminal device, wherein the second correspondence is used to indicate a correspondence between at least one terminal device rank, at least one probability range, and at least one basic parameter set.

In combination with the first aspect or any possible implementation manner thereof, in another possible implementation manner thereof, the determining, by the first device, the first basic parameter set includes:

acquiring, by the first device, a third probability value based on the random function; and determining the first basic parameter set according to a third correspondence, the third probability value, and a service quality rank indicated by service information of the service to be transmitted of the terminal device, wherein the third correspondence is used to indicate a correspondence between at least one service quality rank, at least one probability range, and at least one basic parameter set.

In combination with the first aspect or any possible implementation manner thereof, in another possible implementation manner thereof, the service information of the service to be transmitted of the terminal device is used to indicate at least one of:

a service quality rank of the service to be transmitted, a delay requirement of the service to be transmitted, a data volume amount of the service to be transmitted, a service type of the service to be transmitted, a call type of the service to be transmitted, a bearer corresponding to the service to be transmitted, a data flow corresponding to the service to be transmitted, and a logical channel corresponding to the service to be transmitted.

In combination with the first aspect or any possible implementation manner thereof, in another possible implementation manner thereof, the determining, by the first device, the first basic parameter set includes:

determining, by the first device, the first basic parameter set according to a fourth correspondence and at least one of a service quality rank of the service to be transmitted, a delay requirement of the service to be transmitted, a data volume amount of the service to be transmitted, a service type of the service to be transmitted, a call type of the service to be transmitted, a bearer corresponding to the service to be transmitted, a data flow corresponding to the service to be transmitted, and a logical channel corresponding to the service to be transmitted.

The fourth correspondence is used to indicate a correspondence between at least one basic parameter set and at least one of at least one service quality rank, at least one delay requirement, at least one data volume range, at least one service type, at least one call type, at least one bearer, at least one data flow, and at least one logical channel.

In combination with the first aspect or any possible implementation manner thereof, in another possible implementation manner thereof, the method further includes:

acquiring, by the first device, the service information of the service to be transmitted according to a paging message.

In combination with the first aspect or any possible implementation manner thereof, in another possible implementation manner thereof, the reason for triggering the random access procedure includes any one of:

the terminal device requesting initial access;

the terminal device being switched over from an idle state to a continuous state;

the terminal device requesting uplink synchronization;

the terminal device requesting a terminal device identifier from a network device;

the terminal device making a resource request from the network device;

cell handover of the terminal device; and radio link failure of the terminal device.

In combination with the first aspect or any possible implementation manner thereof, in another possible implementation manner thereof, the determining, by the first device, the first basic parameter set includes:

determining, by the first device, the first basic parameter set according to the reason for triggering the random access procedure and a fifth correspondence, wherein the fifth correspondence is used to indicate a correspondence between at least one reason for triggering the random access procedure and at least one basic parameter set.

In combination with the first aspect or any possible implementation manner thereof, in another possible implementation manner thereof, the determining, by the first device, the first basic parameter set includes:

determining, by the first device, the first basic parameter set according to a sixth correspondence, and a current link quality value between the terminal device and a network device.

The sixth correspondence is used to indicate a correspondence between at least one link quality value and at least one basic parameter set.

In combination with the first aspect or any possible implementation manner thereof, in another possible implementation manner thereof, the determining, by the first device, the first basic parameter set includes:

determining, by the first device, the first basic parameter set according to a seventh correspondence and a location indicated by the information on the location where the terminal device currently is.

The seventh correspondence is used to indicate a correspondence between at least one location and at least one basic parameter set.

In combination with the first aspect or any possible implementation manner thereof, in another possible implementation manner thereof, the information on the location where the terminal device currently is used to indicate a cell where the terminal device currently is, a tracking area, a paging area, or a service area.

In combination with the first aspect or any possible implementation manner thereof, in another possible implementation manner thereof, the determining, by the first device, the first basic parameter set includes:

determining, by the first device, the first basic parameter set according to an eighth correspondence and the time required for performing the random access procedure.

The eighth correspondence is used to indicate a correspondence between at least one time range and at least one basic parameter set.

In combination with the first aspect or any possible implementation manner thereof, in another possible implementation manner thereof, the determining, by the first device, the first basic parameter set includes:

determining, by the first device, the first basic parameter set according to a ninth correspondence and the resource used when transmitting the first message.

The ninth correspondence is used to indicate a correspondence between at least one resource range and at least one basic parameter set.

In combination with the first aspect or any possible implementation manner thereof, in another possible implementation manner thereof, the determining, by the first device, the first basic parameter set includes:

determining, by the first device, the first basic parameter set according to a tenth correspondence and the frequency band of the resource used when transmitting the first message or the frequency band supported by the terminal device.

The tenth correspondence is used to indicate a correspondence between at least one frequency band and at least one basic parameter set.

In combination with the first aspect or any possible implementation manner thereof, in another possible implementation manner thereof, the determining, by the first device, the first basic parameter set used for random access includes:

determining, by the first device, the first basic parameter set according to an eleventh correspondence and the random access mode used when performing the random access procedure.

The eleventh correspondence is used to indicate a correspondence between at least one random access mode and at least one basic parameter set.

In combination with the first aspect or any possible implementation manner thereof, in another possible implementation manner thereof, when performing the random access procedure using different random access modes, the number of interactive messages and/or information carried in the interactive messages is different.

In combination with the first aspect or any possible implementation manner thereof, in another possible implementation manner thereof, the determining, by the first device, the first basic parameter set used for random access includes:

determining, by the first device, a basic parameter set used by the historical message of the random access procedure or a basic parameter set indicated by the information carried in the historical message of the random access procedure as the first basic parameter set.

In combination with the first aspect or any possible implementation manner thereof, in another possible implementation manner thereof, the determining, by the first device, the first basic parameter set used for random access includes:

determining, by the first device, a basic parameter set used by a message transmitted during the historical random access procedure as the first basic parameter set.

In combination with the first aspect or any possible implementation manner thereof, in another possible implementation manner thereof, the first message is a message transmitted from the terminal device to the network device, the first device is the terminal device, and the determining, by the first device, the first basic parameter set for random access includes:

determining, by the terminal device, a pre-configured basic parameter set or a basic parameter set used in a historical random access procedure as the first basic parameter set in a case where the terminal device transmits the first message using a basic parameter set selected for many times but fails to receive a message transmitted by the access network device in response to the first message during the random access procedure.

In combination with the first aspect or any possible implementation manner thereof, in another possible implementation manner thereof, the historical random access procedure is a random access procedure that implements successful access last time, or a last random access procedure.

In combination with the first aspect or any possible implementation manner thereof, in another possible implementation manner thereof, the first message is a message transmitted from the network device to the terminal device, and the first message is further used to indicate a second basic parameter set for data transmission.

The method further includes:

performing data transmission between the first device and the second device according to the second basic parameter set.

In a second aspect, there is provided a device for random access, which may include a unit configured to perform the method in the first aspect or any possible implementation manner.

In a third aspect, there is provided a device for random access, which may include a memory and a processor. The memory stores instructions, and the processor is configured to invoke instructions stored in the memory to perform the method in the first aspect or any possible implementation manner.

In a fourth aspect, there is provided a computer readable medium, which stores a program code for execution by a terminal device, the program code comprising instructions for performing the method in the first aspect or various implementation manners thereof.

In a fifth aspect, there is provided a system chip, which includes an input interface, an output interface, a processor, and a memory. The processor is configured to execute a code in the memory, and when the code is executed, the processor may implement the methods in the first aspect and various foregoing implementation manners.

Therefore, in the embodiment of the present disclosure, when performing the random access procedure, the terminal device may select a basic parameter set, such that random access may be flexibly performed.

BRIEF DESCRIPTION OF THE DRAWINGS

To describe the technical solutions of the embodiments of the present disclosure more clearly, the accompanying drawings required for describing the embodiments or the prior art will be briefly introduced below. Apparently, the accompanying drawings in the following description are merely some embodiments of the present disclosure. To those of ordinary skills in the art, other accompanying drawings may also be derived from these accompanying drawings without creative efforts.

DETAILED DESCRIPTION

Technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Technical solutions in the embodiments of the present disclosure will be described below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The technical solutions of the embodiments of the present disclosure may be applied to various communication systems, for example, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS) or a Worldwide Interoperability for Microwave Access (WiMAX) communication system, or a future 5G system, etc.

Figures 1, 2:
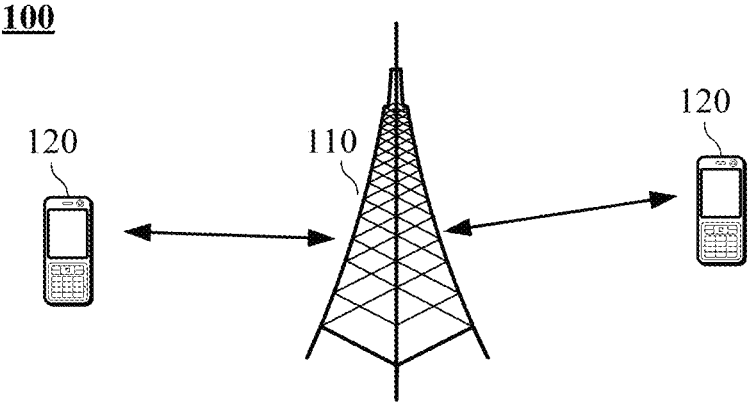
FIG. 1 is a schematic block diagram of a wireless communication system according to an embodiment of the present disclosure.
FIG. 2 is a schematic flowchart of a method for random access according to an embodiment of the present disclosure.

FIG. 1 illustrates a wireless communication system 100 used in an embodiment of the present disclosure. The wireless communication system 100 may include a network device 110. The network device 110 may be a device communicating with a terminal device. The network device 110 may provide communication coverage for a particular geographic region, and may communicate with a terminal device (such as UE) positioned within the coverage region. Optionally, the network device 110 may be a Base Transceiver Station (BTS) in a GSM system or a CDMA system, a NodeB (NB) in a WCDMA system, an Evolutional Node B (eNB or eNodeB) in a LTE system, an LTE Time Division Duplex (TDD) system, or a wireless controller in Cloud Radio Access Network (CRAN), or a relay station, an access point, a vehicle-mounted device, a wearable device, a network side device in a future 5G network, or a network device in a future evolutional Public Land Mobile Network (PLMN).

The wireless communication system 100 further includes at least one terminal device 120 positioned within the coverage range of the network device 110. The terminal device 120 may be either mobile or fixed. Optionally, the terminal device 120 may refer to an access terminal, user equipment (UE), a subscriber unit, a subscriber station, a mobile station, a remote station, a remote terminal, a mobile device, a user terminal, a terminal, a wireless communication device, a user agent, or a user apparatus. The terminal device may be a cellular phone, a cordless phone, an SIP (Session Initiation Protocol) phone, a WLL (Wireless Local Loop) station, a PDA (Personal Digital Assistant), a handheld device having a wireless communication function, a computing device, or another processing device connected to a wireless modem, a vehicle-mounted device, a wearable device, a terminal device in the future 5G network, or a terminal device in the future evolutional PLMN, etc.

Optionally, the 5G system or network may also be referred to as a new radio (NR) system or network.

The basic parameter set mentioned in the embodiments of the present disclosure may include at least one of the following parameters:

subcarrier spacing, the number of subcarriers in a particular bandwidth, the number of subcarriers in a physical resource block (PRB), length of Orthogonal Frequency Division Multiplexing (OFDM) symbol, the number of points of Fourier Transform such as Fast Fourier Transform (FFT) or Inverse Fourier Transform such as Inverse Fast Fourier Transform (IFFT) for generating an OFDM signal, the number of OFDM symbols in transmission time interval (TTI), the number of TTIs included within a certain length of time, and length of a signal prefix.

The subcarrier spacing refers to the frequency spacing between adjacent subcarriers, for example, 15 kHz or 60 kHz, etc. The number of subcarriers in the particular bandwidth refers to, for example, the number of subcarriers corresponding to each possible system bandwidth. The number of subcarriers included in the PRB typically may be, for example, an integer multiple of 12. The number of the OFDM symbols included in the TTI typically may be, for example, the integer multiple of 14. The number of the TTIs included within the certain length of time may refer to the number of TTIs included within 1 ms or 10 ms. The length of the signal prefix may refer to, for example, the length of time of a cyclic prefix of a signal, or whether the cyclic prefix uses a normal CP or an extended CP.

FIG. 1 schematically illustrates one network device and two terminal devices. Optionally, the wireless communication system 100 may include a plurality of network devices, and each of the network devices may include other numbers of terminal devices within its coverage range, which is not limited in the embodiments of the present disclosure.

Optionally, the wireless communication system 100 may further include other network entities, such as a network controller, a mobility management entity, and the like, which is not limited in the embodiments of the present disclosure.

It is to be understood that terms "system" and "network" herein are often used interchangeably herein. It is to be understood that the "and/or" used for describing an association relationship between association objects represents presence of three relationships. For example, A and/or B may represent presence of the A only, presence of both the A and the B, and presence of the B only. Moreover, Character "/" generally indicates that an "or" relationship is between the association objects.

FIG. 2 is a schematic flowchart of a method 200 for random access according to an embodiment of the present disclosure. Optionally, the method 200 either may be performed by the terminal device as shown in FIG. 1, or may be performed by the network device as shown in FIG. 1.

As shown in FIG. 2, the method 200 includes following steps.

In Step 210, a first device determines a first basic parameter set used by a first message transmitted during a random access procedure.

In Step 220, the first device transmits the first message to a second device using the first basic parameter set, or receives the first message transmitted by the second device.

Optionally, the first device is a terminal device, and the second device is an access network device; or the first device is an access network device, and the second device is a terminal device.

Optionally, the first message used for random access is a message transmitted during a 4-step random access procedure, or a message transmitted during a 2-step random access procedure.

Figure 3:
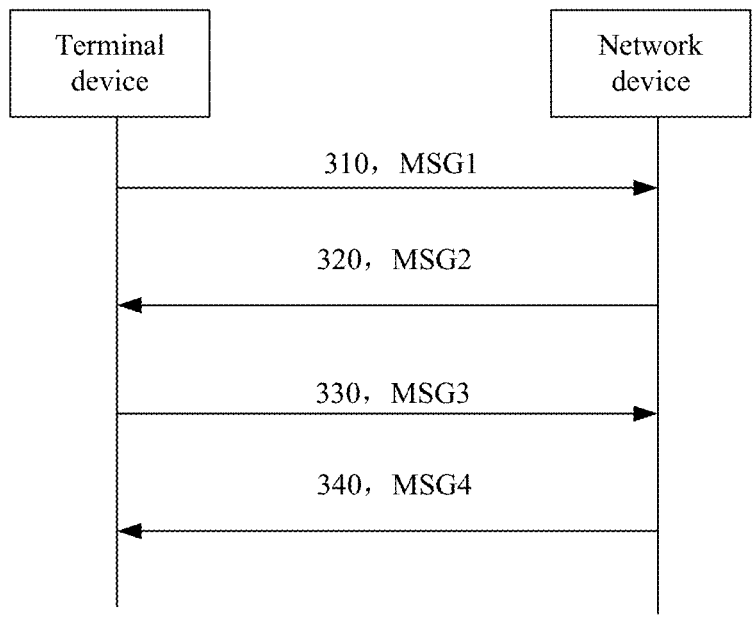
FIG. 3 is a schematic flowchart of a 4-step random access procedure according to an embodiment of the present disclosure.
Figure 4:
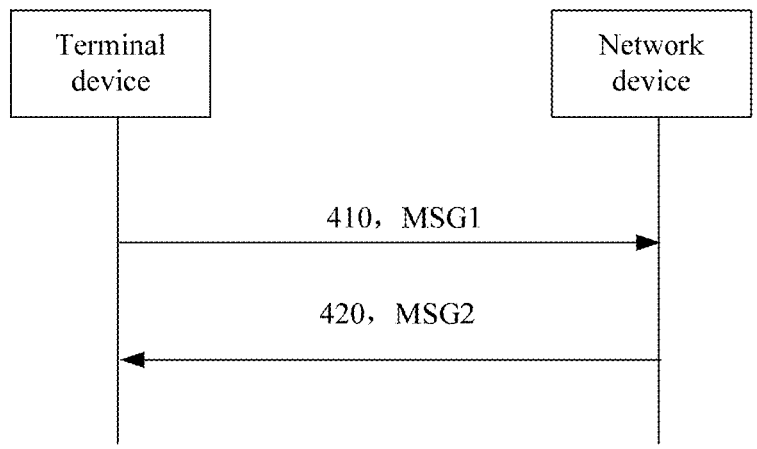
FIG. 4 is a schematic flowchart of a 2-step random access procedure according to an embodiment of the present disclosure.

The 4-step random access procedure and the 2-step random access procedure of the embodiments of the present disclosure will be described below with reference to the method 300 as shown in FIG. 3 and the method 400 as shown in FIG. 4.

As shown in FIG. 3, the 4-step random access procedure as shown in the method 300 includes following steps.

In Step 310, the terminal device transmits an MSG1 on a random access channel, wherein the MSG1 is a message carrying a random access preamble.

In Step 320, after receiving the MSG1, the network device transmits an MSG2 on a downlink share channel (DL-SCH), wherein the MSG2 is a random access response (RAR), and the RAR carries a TA adjustment, an uplink grant command and a temporary cell radio network temporary identifier (T-CRNTI), i.e., a temporary CRNTI.

Optionally, the MSG2 message is generated by a media access control (MAC) layer of the network device, and is carried by the DL SCH, wherein one MSG2 message may simultaneously correspond to the random access request response of a plurality of terminal devices.

Optionally, the network device schedules the MSG2 using a physical downlink control channel (PDCCH) and addresses using a random access radio network temporary identifier (RA-RNTI), wherein the RA-RNTI is determined by time-frequency resource location of a physical random access channel (PRACH) carrying the MSG1.

Optionally, the MSG2 includes an uplink transmission timing advance, an uplink resource allocated for an MSG3, a temporary C-RNTI, and the like.

In Step 330, after receiving the MSG2, the terminal device determines whether the MSG2 is an RAR message belongs to itself, and transmits the MSG-3 when it is determined that the MSG2 is the RAR message belongs to itself, wherein the MSG-3 carries a UE-ID, and in the MSG3, what is transmitted is an RRC connection request generated by an RRC layer of the UE. The RRC connection request may be mapped onto a common control channel (CCCH) on an uplink shared channel (UL-SCH) and may be transmitted.

Optionally, in the 4-step random access procedure, both the MSG1 and the MSG2 are low-layer messages, and the Layer 3 (L3) is invisible. Therefore, in signaling tracking, the first signaling access to the terminal device may be the MSG3.

Optionally, after receiving the MSG2, the network device transmits the MSG3 on the uplink resource allocated for the network device.

In Step 340, after receiving the MSG3, the network device may transmit the MSG4, wherein the MSG4 carries a UE-ID, and in the MSG4, what is transmitted is an RRC contention resolution message, which may be generated by an RRC layer of the network device, and may be mapped onto the CCCH or a dedicated control channel (DCCH) on the DL-SCH and may be transmitted. After the terminal device receives the MSG4, if the MSG4 carries a UE-ID belonging to its own, the terminal device determines that the random access is successful.

Optionally, in the embodiments of the present disclosure, contents included in each message during the random access procedure may be different for different scenarios.

For example, for initial access of the terminal device, the MSG3 may carry an RRC connection request generated by the RRC layer, including an S-TMSI or a random number of the UE.

For example, for connection reestablishment, the MSG3 may carry an RRC connection reestablishment request generated by the RRC layer, C-RNTI and PCI.

For example, for the cell handover of the terminal device, the MSG3 may carry an RRC handover complete message generated by the RRC layer, and C-RNTI of the UE.

For example, for a scenario where uplink/downlink data arrive, the MSG3 may transmit the C-RNTI of the terminal device.

Table 1 below shows the description of contention determination, scheduling, and C-RNTI in different scenarios.

TABLE 1

| Contention solution | Initial access and connection reestablishment | Handover, uplink/downlink data arrive at the scenarios |
|---|---|---|
| Contention determination | The MSG4 carries a copy of the successfully demodulated MSG3, and the UE compares the MSG3 with a high-layer identifier transmitted by itself in the MSG3. It is determined that the contention is successful if the MSG3 is the same as the high-layer identifier. | It is determined that the contention is successful if the terminal device receives a command of scheduling an MSG4 on the PDCCH. |
| Scheduling | The MSG4 uses PDCCH scheduling scrambled by a temporary C-RNTI. | The network device schedules the MSG4 using the PDCCH scrambled by the C-RNTI. |
| C-RNTI | The temporary C-RNTI delivered in the MSG2 is upgraded to be the C-RNTI of the UE after the contention is successful. | The terminal device has previously been assigned the C-RNTI, which is also transmitted to the network device in the MSG3. After the contention is resolved, the temporary C-RNTI is taken back and the original C-RNTI of the terminal device is continued to be used. |

It is to be understood that the method 300 as shown in FIG. 3 is merely one specific implementation manner of the 4-step random access procedure, which should not limit the scope of protection of the present disclosure.

FIG. 4 is a schematic diagram of a 2-step random access procedure according to an embodiment of the present disclosure. As shown in FIG. 4, the 2-step random access procedure as shown in the method 400 includes following steps.

In Step 410, the terminal device transmits the MSG1, wherein the MSG1 carries a random access preamble, and at least one piece of identifier information of the terminal device, data cache state information to be transmitted by the terminal device, and connection establishment request information.

In Step 420, the network device transmits the MSG2 to the terminal device, wherein the MSG2 carries a TA adjustment, an uplink grant command and T-CRNTI, and at least one of identifier information of the terminal device and connection establishment response information.

It is to be understood that the method 400 as shown in FIG. 4 is merely one specific implementation manner of the 2-step random access procedure, which should not limit the scope of protection of the present disclosure.

It is to be understood that the first message in the embodiments of the present disclosure may be the MSG1, the MSG2, the MSG3 or the MSG4, wherein information carried in the MSG1, the MSG2, the MSG3 or the MSG4 may be as described in FIG. 3 or FIG. 4, but the embodiments of the present disclosure are not limited thereto.

Optionally, the random access procedure in the embodiments of the present disclosure may be a contention-based random access procedure or a non-contention-based random access procedure. During the non-contention-based random access procedure, the network device may transmit an MSG0 before transmitting the MSG1, wherein the MSG0 may be used to specify the resources occupied for transmitting the MSG1 by the terminal device, and specify the random access preamble included in the MSG1. The non-contention-based random access procedure is applicable to the 2-step random access procedure and the 4-step random access procedure.

Optionally, the contention-based random access procedure may be used in the following scenarios:

1) initial access in the RRC IDLE state;
2) initial access after occurrence of a radio link error; and
3) In the RRC CONNECTED state, when there is access in the scenario of uplink data transmission, for example, in the case of uplink "non-synchronized" or no PUCCH resource for transmitting a scheduling request message, in this case, except for by way of random access, there is no other way to inform the network device that there exists uplink data to be transmitted by the terminal device.

Optionally, the non-contention-based random access procedure may be used in the following scenarios:

1) In the RRC CONNECTED state, in case of downlink data transmission, uplink "non-synchronized" may occur in this case. This is because data transmission needs to be acknowledged in addition to be received. In case of uplink "non-synchronized", it cannot be guaranteed that the network device can receive acknowledgment information from the terminal device because the downlink is still synchronized. Therefore, the terminal device may be informed to initiate resources require for random access by way of a downlink message such as a preamble sequence and a transmission opportunity. These resources are known to both the network device and the terminal device, and thus there is no need to access the system by way of contention; and
2) Random access during handover, in the process of handover, a target network device may inform the terminal device of the resources that can be used via a service network device.

Therefore, in the embodiments of the present disclosure, when transmitting a message during the random access procedure, the network device and the terminal device may flexibly select a basic parameter set, and it is unnecessary to adopt a fixed basic parameter set.

Optionally, in the embodiments of the present disclosure, the first device determines the first basic parameter set according to at least one of following information:

pre-configured multiple basic parameter sets;
a random function;
rank information of the terminal device;
a current link quality value between the terminal device and the access network device;
information on a location where the terminal device currently is;
time required for performing the random access procedure;
information on a service to be transmitted of the terminal device;
a reason for triggering the random access procedure;
a resource used when transmitting the first message;
a frequency band of a frequency domain resource used when transmitting the first message;
a basic parameter set supported by the terminal device;
a frequency band supported by the terminal device;
a random access mode used when performing the random access procedure;
information for indicating a basic parameter set carried in a historical message prior to the first message; and
a basic parameter set used by the historical message prior to the first message.

For ease of understanding, how to determine the first basic parameter set will be described below in conjunction with a specific implementation manner.

In an implementation manner, the first device selects the first basic parameter set from the pre-configured multiple basic parameter sets.

The first device may be a terminal device, and the pre-configured multiple basic parameter sets may be configured by the network device for the terminal device. Optionally, the multiple basic parameter sets may be pre-configured in other ways. For example, the multiple basic parameter sets may be pre-configured at factory or during initialization.

In an implementation manner, the first device acquires a first probability value based on the random function, and determines the first basic parameter set according to a first correspondence and the first probability value. The first correspondence is used to indicate a correspondence between at least one probability range and at least one basic parameter set.

For example, supposing the first device is the terminal device and the second device is the network device, the network device configures, in the system information, the probability range required when the terminal device uses each basic parameter set. Before initiating the random access procedure, the terminal device may obtain a probability value using a random function, and may select the basic parameter set corresponding to the probability range to which the probability value belongs.

Optionally, in this implementation manner, the first device may be a network device, and the second device may be a terminal device.

It is to be understood that the network device may only configure the probability range of a part of the basic parameter sets. A corresponding basic parameter set is selected if the basic parameter set is within the probability range configured by the network device, otherwise, other basic parameter sets are selected.

In an implementation manner, the first device acquires a second probability value based on the random function, and determines the first basic parameter set according to a second correspondence, the second probability value, and a rank indicated by the rank information of the terminal device. The second correspondence is used to indicate a correspondence between at least one terminal device rank, at least one probability range, and at least one basic parameter set.

Specifically, supposing the first device is a terminal device and the second device is a network device, the network device configures a second correspondence in the system information, wherein the second correspondence is used to indicate a probability range corresponding to each terminal device level and a basic parameter set. For example, for the terminal device level A, the basic parameter set 1 is used when the probability range is from 0 to 50, and the basic parameter set 2 is used when the probability range is from 51 to 100.

Optionally, in this implementation manner, the first device may be a network device, and the second device may be a terminal device.

It is to be understood that the network device may only configure the probability range corresponding to a part of the basic parameter sets for a certain terminal level. A corresponding basic parameter set is selected if the basic parameter set is within the probability range configured by the network device, otherwise, other basic parameter sets are selected.

In an implementation manner, the first device acquires a third probability value based on the random function, and determines the first basic parameter set according to a third correspondence, the third probability value, and a service quality rank indicated by service information of the service to be transmitted of the terminal device. The third correspondence is used to indicate a correspondence between at least one service quality rank, at least one probability range, and at least one basic parameter set.

Specifically, supposing the first device is a terminal device and the second device is a network device, the network device configures a third correspondence in the system information, wherein the third correspondence is used to indicate a probability range corresponding to each service quality rank and a basic parameter set. For example, for the service quality rank A, the basic parameter set 1 is used when the probability range is from 0 to 50, and the basic parameter set 2 is used when the probability range is from 51 to 100.

Optionally, in this implementation manner, the first device may be a network device, and the second device may be a terminal device.

It is to be understood that the network device may merely configure the probability range corresponding to a part of the basic parameter sets for a certain service quality rank. A corresponding basic parameter set is selected if the basic parameter set is within the probability range configured by the network device, otherwise, other basic parameter sets are selected.

Optionally, the service information of the service to be transmitted of the terminal device is used to indicate at least one of:

a service quality rank of the service to be transmitted, a delay requirement of the service to be transmitted, a data volume amount of the service to be transmitted, a service type of the service to be transmitted, a call type of the service to be transmitted, a bearer corresponding to the service to be transmitted, a data flow corresponding to the service to be transmitted, and a logical channel corresponding to the service to be transmitted.

Optionally, the first device determines the first basic parameter set according to a fourth correspondence and at least one of a service quality rank of the service to be transmitted, a delay requirement of the service to be transmitted, a data volume amount of the service to be transmitted, a service type of the service to be transmitted, a call type of the service to be transmitted, a bearer corresponding to the service to be transmitted, a data flow corresponding to the service to be transmitted, and a logical channel corresponding to the service to be transmitted.

The fourth correspondence is used to indicate a correspondence between at least one basic parameter set and at least one of at least one service quality rank, at least one delay requirement, at least one data volume range, at least one service type, at least one call type, at least one bearer, at least one data flow, and at least one logical channel.

For example, when the terminal device initiates a service having a higher delay requirement, a message during the random access procedure may be transmitted with a shorter TTI or a larger subcarrier spacing. For example, the MSG1 or the MSG3 is transmitted.

Optionally, the first device acquires the service information of the service to be transmitted according to a paging message.

Specifically, if the first device is a terminal device, the terminal device may obtain service information of the service to be transmitted from a paging message transmitted by the network device. If the first device is a network device, the network device may obtain the service information of the service to be transmitted of the terminal device from a paging message from a core network device, and transmit the paging message to the terminal device.

Optionally, the first device is a network device, and the first message may be the MSG2 or the MSG4, and the network device may obtain the service information of the service to be transmitted from the MSG1 or the MSG3 transmitted by the terminal device.

Optionally, the reason for triggering the random access procedure includes any one of:

the terminal device requesting initial access;

the terminal device being switched over from an idle state to a continuous state;

the terminal device requesting uplink synchronization;

the terminal device requesting a terminal device identifier from a network device;

the terminal device making a resource request from the network device;

cell handover of the terminal device; and radio link failure of the terminal device.

Optionally, the first device determines the first basic parameter set according to the reason for triggering the random access procedure and a fifth correspondence. The fifth correspondence is used to indicate a correspondence between at least one reason for triggering the random access procedure and at least one basic parameter set.

For example, when the terminal device needs to perform RRC re-establishment due to radio link failure, in order to quickly restore the connection, a message (for example, the MSG1 or the MSG3) transmitted during the random access procedure may be transmitted with a shorter TTI or a larger subcarrier spacing.

For example, when the terminal device performs the handover, the terminal device needs to first perform random access in a target cell after receiving a handover command. To reduce the handover delay, the terminal may transmit a message (for example, the MSG1 or the MSG3) transmitted during the random access procedure with a shorter TTI or a larger subcarrier spacing.

Optionally, when the first device is a network device, the network device may determine a reason for triggering the random access procedure according to information carried in the message during the random access procedure.

Optionally, the first device determines the first basic parameter set according to a sixth correspondence, and a current link quality value between the terminal device and a network device.

The sixth correspondence is used to indicate a correspondence between at least one link quality value and at least one basic parameter set.

In an implementation manner, the first device determines the first basic parameter set according to a seventh correspondence and a location indicated by the information on the location where the terminal device currently is.

The seventh correspondence is used to indicate a correspondence between at least one location and at least one basic parameter set.

Optionally, the information on the location where the terminal device currently is used to indicate a cell where the terminal device currently is, a tracking area, a paging area, or a service area.

Specifically, the network device may transmit the system information to the terminal device in a cell corresponding to each basic parameter set, a tracking area, a paging area, or a service area (also referred to as a business service area), or the terminal device also may obtain the information from a core network through signature information or an NAS layer message.

Optionally, the first device determines the first basic parameter set according to an eighth correspondence and the time required for performing the random access procedure.

The eighth correspondence is used to indicate a correspondence between at least one time range and at least one basic parameter set.

The time range of each basic parameter set may be in hours or days. For example, the basic parameter set 1 is used from 0:00 to 12:00 every day, and the basic parameter set 2 is used at other time.

Optionally, the first device determines the first basic parameter set according to a ninth correspondence and the resource used when transmitting the first message.

The ninth correspondence is used to indicate a correspondence between at least one resource range and at least one basic parameter set.

Optionally, the resource used to determine the basic parameter set may be at least one of a time domain resource, a frequency domain resource, a code domain resource, and an air domain (e.g., beam) resource.

In an implementation manner, the first device determines the first basic parameter set according to a tenth correspondence and the frequency band of the resource used when transmitting the first message or the frequency band supported by the terminal device.

The tenth correspondence is used to indicate a correspondence between at least one frequency band and at least one basic parameter set.

Specifically, the network device may configure a basic parameter set available on each frequency band, and the terminal may select a corresponding basic parameter set according to a selected random access frequency band or a supported frequency band.

In an implementation manner, the first device determines the first basic parameter set according to an eleventh correspondence and the random access mode used when performing the random access procedure.

The eleventh correspondence is used to indicate a correspondence between at least one random access mode and at least one basic parameter set.

In an implementation manner, when performing the random access procedure using different random access modes, the number of interactive messages and/or information carried in the interactive messages is different.

In an implementation manner, the first device determines a basic parameter set used by the historical message of the random access procedure or a basic parameter set indicated by the information carried in the historical message of the random access procedure as the first basic parameter set.

For example, supposing the first device is a network device and the second device is a terminal device, when transmitting the MSG2, the network device may determine the basic parameter set used when transmitting the MSG1 as the basic parameter set for transmitting the MSG2, or when transmitting the MSG4, the network device may determine the basic parameter set used when transmitting the MSG3 as the basic parameter set for transmitting the MSG4.

For example, supposing the first device is a terminal device and the second device is a network device, when transmitting the MSG3, the terminal device may determine the basic parameter set used when transmitting the MSG2 as the basic parameter set for transmitting the MSG3, or the terminal device may determine the basic parameter set indicated by the information carried in the MSG2 as the basic parameter set for transmitting the MSG3.

In an implementation manner, the first device determines a basic parameter set used by a message transmitted during the historical random access procedure as the first basic parameter set.

Specifically, the terminal device or the network device may determine the basic parameter set used in the random access procedure that implements successful access last time or the basic parameter set used in the last random access procedure as the first basic parameter set.

For example, when transmitting the MSG1, the terminal device may determine the basic parameter set used by the MSG1 transmitted during the random access procedure that implements successful access last time as the basic parameter set used for transmitting the MSG1 this time.

For example, when transmitting the MSG3, the terminal device may determine the basic parameter set used by the MSG3 transmitted during the random access procedure that implements successful access last time as the basic parameter set used for transmitting the MSG3 this time.

In an implementation manner, the terminal device determines a pre-configured basic parameter set or a basic parameter set used in a historical random access procedure as the first basic parameter set in a case where the terminal device transmits the first message using a basic parameter set selected for many times but fails to receive a message transmitted by the access network device in response to the first message during the random access procedure.

For example, if the terminal device transmits the MSG1 using a certain basic parameter set for many times but fails to receive the MSG2, the terminal device may determine the basic parameter set used by the MSG1 transmitted during the random access procedure that implements successful access last time as the basic parameter set used for transmitting the MSG1 this time.

For example, if the terminal device transmits the MSG1 using a certain basic parameter set for many times but fails to receive the MSG2, the terminal device may determine the basic parameter set used by the MSG1 transmitted during the random access procedure last time as the basic parameter set used for transmitting the MSG1 this time.

For example, in the case where the terminal device transmits the MSG1 using a certain basic parameter set for many times but fails to receive the MSG2, the terminal device may determine a pre-configured basic parameter set as the basic parameter set used for transmitting the MSG1 next time.

Optionally, the first message is a message transmitted from the network device to the terminal device, and the first message is further used to indicate a second basic parameter set for data transmission. Data transmission is carried out between the first device and the second device according to the second basic parameter set.

Optionally, various correspondences or thresholds and the like as mentioned in the embodiments of the present disclosure may be pre-configured, which may be, for example, configured by the network device for the terminal device, or may be pre-configured at factory or during initialization, or may be obtained via signature information.

Optionally, various correspondences or thresholds and the like as mentioned in the embodiments of the present disclosure may be pre-configured at an NAS layer.

Therefore, in the embodiments of the present disclosure, when transmitting a message during the random access procedure, the network device and the terminal device may flexibly select a basic parameter set based on specific situations, and it is unnecessary to select a fixed basic parameter set.

Figure 5:
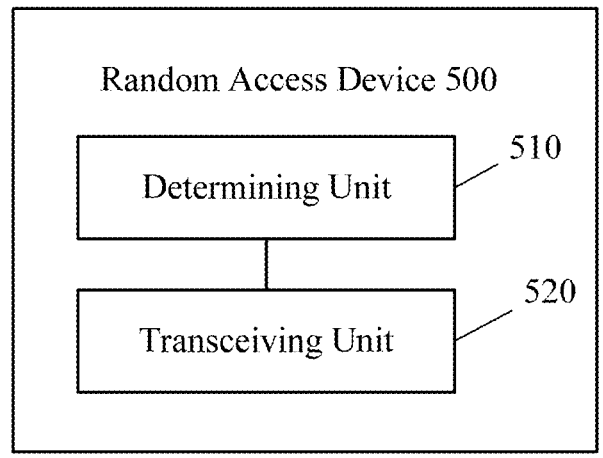
FIG. 5 is a schematic block diagram of a device for random access according to an embodiment of the present disclosure.

FIG. 5 is a schematic block diagram of a device 500 for random access according to an embodiment of the present disclosure. As shown in FIG. 5, the device 500 includes a determining unit 510 and a transceiving unit 520.

The determining unit 510 is configured to determine a first basic parameter set used by a first message transmitted during a random access procedure. The transceiving unit 520 is configured to transmit the first message to a second device by using the first basic parameter set, or receive the first message transmitted by the second device.

Optionally, the first message used for random access is a message transmitted during a 4-step random access procedure, or a message transmitted during a 2-step random access procedure.

Optionally, the device 500 is a terminal device, and the second device is an access network device.

Optionally, the device 500 is an access network device, and the second device is a terminal device.

Optionally, the determining unit 510 is further configured to:
determine the first basic parameter set according to at least one of following information:
pre-configured multiple basic parameter sets;
a random function;
rank information of the terminal device;
a current link quality value between the terminal device and the access network device;
information on a location where the terminal device currently is;
time required for performing the random access procedure;
information on a service to be transmitted of the terminal device;
a reason for triggering the random access procedure;
a resource used when transmitting the first message;
a frequency band of a frequency domain resource used when transmitting the first message;
a basic parameter set supported by the terminal device;
a frequency band supported by the terminal device;
a random access mode used when performing the random access procedure;
information for indicating a basic parameter set carried in a historical message prior to the first message; and
a basic parameter set used by the historical message prior to the first message.

Optionally, the determining unit 510 is further configured to:
select the first basic parameter set from the pre-configured multiple basic parameter sets.

Optionally, the determining unit 510 is further configured to:
acquire a first probability value based on the random function; and
determine the first basic parameter set according to a first correspondence and the first probability value, wherein the first correspondence is used to indicate a correspondence between at least one probability range and at least one basic parameter set.

Optionally, the determining unit 510 is further configured to:
acquire a second probability value based on the random function; and
determine the first basic parameter set according to a second correspondence, the second probability value, and a rank indicated by the rank information of the terminal device, wherein the second correspondence is used to indicate a correspondence between at least one terminal device rank, at least one probability range, and at least one basic parameter set.

Optionally, the determining unit 510 is further configured to:
acquire a third probability value based on the random function; and
determine the first basic parameter set according to a third correspondence, the third probability value, and a service quality rank indicated by service information of the service to be transmitted of the terminal device, wherein the third correspondence is used to indicate a correspondence between at least one service quality rank, at least one probability range, and at least one basic parameter set.

Optionally, the service information of the service to be transmitted of the terminal device is used to indicate at least one of:
a service quality rank of the service to be transmitted, a delay requirement of the service to be transmitted, a data volume amount of the service to be transmitted, a service type of the service to be transmitted, a call type of the service to be transmitted, a bearer corresponding to the service to be transmitted, a data flow corresponding to the service to be transmitted, and a logical channel corresponding to the service to be transmitted.

Optionally, the determining unit 510 is further configured to:
determine the first basic parameter set according to a fourth correspondence and at least one of a service quality rank of the service to be transmitted, a delay requirement of the service to be transmitted, a data volume amount of the service to be transmitted, a service type of the service to be transmitted, a call type of the service to be transmitted, a bearer corresponding to the service to be transmitted, a data flow corresponding to the service to be transmitted, and a logical channel corresponding to the service to be transmitted.

The fourth correspondence is used to indicate a correspondence between at least one basic parameter set and at least one of at least one service quality rank, at least one delay requirement, at least one data volume range, at least one service type, at least one call type, at least one bearer, at least one data flow, and at least one logical channel.

Optionally, the determining unit 510 is further configured to:
acquire the service information of the service to be transmitted according to a paging message.

Optionally, the reason for triggering the random access procedure includes any one of:
the terminal device requesting initial access;
the terminal device being switched over from an idle state to a continuous state;
the terminal device requesting uplink synchronization;
the terminal device requesting a terminal device identifier from a network device;

the terminal device making a resource request from the network device;

cell handover of the terminal device; and radio link failure of the terminal device.

Optionally, the determining unit 510 is further configured to:

determine the first basic parameter set according to the reason for triggering the random access procedure and a fifth correspondence, wherein the fifth correspondence is used to indicate a correspondence between at least one reason for triggering the random access procedure and at least one basic parameter set.

Optionally, the determining unit 510 is further configured to:

determine the first basic parameter set according to a sixth correspondence, and a current link quality value between the terminal device and a network device;

The sixth correspondence is used to indicate a correspondence between at least one link quality value and at least one basic parameter set.

Optionally, the determining unit 510 is further configured to:

determine the first basic parameter set according to a seventh correspondence and a location indicated by the information on the location where the terminal device currently is;

The seventh correspondence is used to indicate a correspondence between at least one location and at least one basic parameter set.

Optionally, the information on the location where the terminal device currently is used to indicate a cell where the terminal device currently is, a tracking area, a paging area, or a service area.

Optionally, the determining unit 510 is further configured to:

determine the first basic parameter set according to an eighth correspondence and the time required for performing the random access procedure.

The eighth correspondence is used to indicate a correspondence between at least one time range and at least one basic parameter set.

Optionally, the determining unit 510 is further configured to:

determine the first basic parameter set according to a ninth correspondence and the resource used when transmitting the first message.

The ninth correspondence is used to indicate a correspondence between at least one resource range and at least one basic parameter set.

Optionally, the determining unit 510 is further configured to:

determine the first basic parameter set according to a tenth correspondence and the frequency band of the resource used when transmitting the first message or the frequency band supported by the terminal device.

The tenth correspondence is used to indicate a correspondence between at least one frequency band and at least one basic parameter set.

Optionally, the determining unit 510 is further configured to:

determine the first basic parameter set according to an eleventh correspondence and the random access mode used when performing the random access procedure.

The eleventh correspondence is used to indicate a correspondence between at least one random access mode and at least one basic parameter set.

Optionally, when performing the random access procedure using different random access modes, the number of interactive messages and/or information carried in the interactive messages is different.

Optionally, the determining unit 510 is further configured to:

determine a basic parameter set used by the historical message of the random access procedure or a basic parameter set indicated by the information carried in the historical message of the random access procedure as the first basic parameter set.

Optionally, the determining unit 510 is further configured to:

determine a basic parameter set used by a message transmitted in the historical random access procedure as the first basic parameter set.

Optionally, the first message is a message transmitted from the terminal device to the network device, the device is the terminal device, and the determining unit 510 is further configured to:

determine a pre-configured basic parameter set or a basic parameter set used in a historical random access procedure as the first basic parameter set in a case where the terminal device transmits the first message using a basic parameter set selected for many times but fails to receive a message transmitted by the access network device in response to the first message during the random access procedure.

Optionally, the historical random access procedure is a random access procedure that implements successful access last time, or a last random access procedure.

Optionally, the first message is a message transmitted from the network device to the terminal device, and the first message is further used to indicate a second basic parameter set for data transmission.

The transceiving unit 520 is further configured to:

perform data transmission between the device and the second device according to the second basic parameter set.

It is to be understood that the first device 500 may perform the method 200 as shown in FIG. 2, and details are not described herein for brevity.

Figure 6:
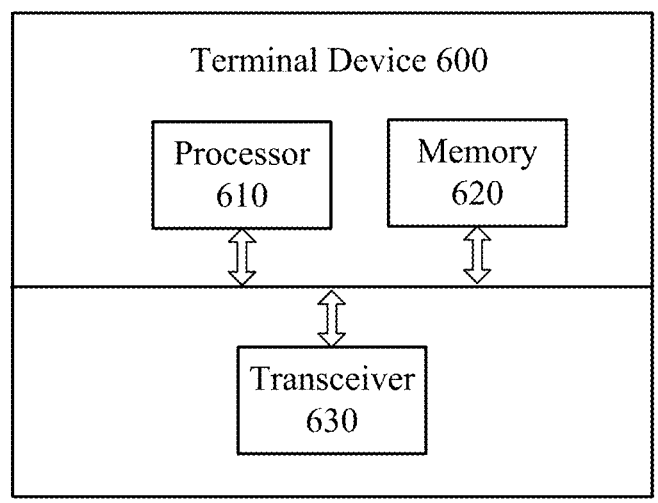
FIG. 6 is a schematic block diagram of a device for random access according to an embodiment of the present disclosure.

FIG. 6 is a schematic block diagram of a device 600 for random access according to an embodiment of the present disclosure. As shown in FIG. 6, the device 600 may include a processor 610 and a memory 620. The memory 620 may store a program code, and the processor 610 may execute the program code stored in the memory 620.

Optionally, as shown in FIG. 6, the device 600 may include a transceiver 630, and the processor 610 may control the transceiver 630 to communicate externally.

Optionally, the processor 610 may call the program code stored in the memory 620 to perform the corresponding operations of the first device in the method 200 as shown in FIG. 2, and details are not described herein for brevity.

Figure 7:
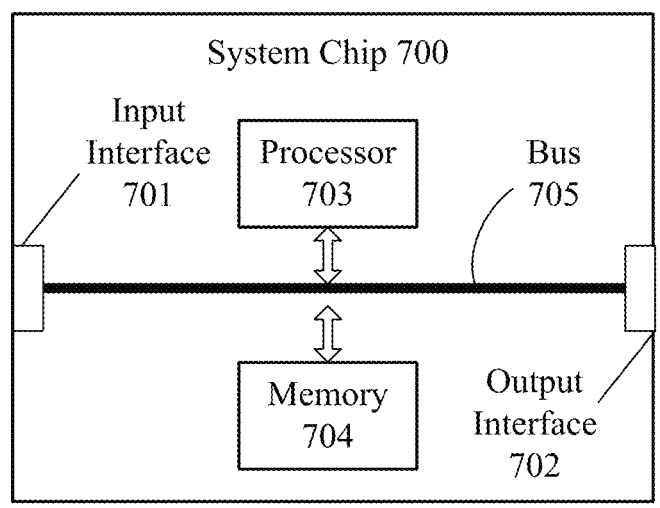
FIG. 7 is a schematic block diagram of a device for random access according to an embodiment of the present disclosure.

FIG. 7 is a schematic structural diagram of a system chip according to an embodiment of the present disclosure. The system chip 700 in FIG. 7 includes an input interface 701, an output interface 702, a processor 703, and a memory 704. The processor 703 is in communication connection to the memory 704, and the processor 703 is configured to execute a code stored in the memory 704.

Optionally, when the code is executed, the processor 703 implements the method performed by the first device in the method embodiment. Details are not described herein for brevity.

Persons of ordinary skill in the art may realize that it is possible to implement, by electronic hardware or a combination of computer software and electronic hardware, steps of units and methods in various examples as described in the embodiments disclosed herein.

Whether these functions are executed in a hardware mode or a software mode depends on specific applications and design constraints on the technical solutions. Technical professionals may use different methods to implement functions as described in each of the specific applications. However, the implementation shall be not believed beyond the scope of the present disclosure.

Persons skilled in the art may clearly understand that for a convenient and concise description, a concrete work process of systems, apparatuses and units described above may refer to a corresponding process of the foregoing method embodiments, which is not repeated anymore herein.

From several embodiments provided in the present disclosure, it should be understood that the disclosed systems, apparatuses and methods may be implemented in other ways. For example, the apparatus embodiments described above are merely exemplary. For example, a unit partition is merely a logic functional partition. In actual implementation, additional manners of partitioning may be available. For example, multiple units or components may be combined or integrated into another system, or some features may be ignored and not executed. For another thing, intercoupling or direct coupling or communications connection displayed or discussed may be indirect coupling or communications connection, electrical or mechanical or in other forms, by means of some interfaces, apparatuses or units.

The unit serving as a detached component may be or not be physically detached, the component serving as a unit display may be or not be a physical unit, i.e., either located at one place or distributed on a plurality of network elements. Units may be selected in part or in whole according to actual needs for achieving objectives of the solution of this embodiment.

In addition, various functional units in various embodiments of the present disclosure may be integrated into one processing unit, or various units may be separately or physically existent, or two or more units may be integrated into one unit.

When the functions are implemented in the form of a software functional unit and sold or used as an independent product, the functions may be stored in a computer-readable storage medium. On the basis of such an understanding, the technical solution of the present disclosure in essence or that part of contribution to the prior art or a part of the technical solution may be embodied in the form of software products, which may be stored in a storage medium, comprising some instructions to cause a computer device (a personal computer, a server, an access network device or the like) to perform all or a part of steps of the method as recited in the embodiments of the present disclosure. The aforementioned storage medium may include: a USB flash disk, a mobile hard disk, a read-only memory (ROM), a random access memory (RAM), a magnetic disk or an optical disk and other media capable of storing a program code.

The above-mentioned embodiments are merely specific embodiments of the present disclosure, but the protection scope of the present disclosure is not limited thereto. Any variation or substitution easily conceivable to a person of ordinary skills in the art within the technical scope disclosed in the present disclosure shall fall into the protection scope of the present disclosure. Therefore, the scope of protection of the present disclosure shall be subject to the scope of protection of the claims.

What is claimed is:

1. A method for random access, comprising:
   determining, by a first device, a first subcarrier spacing to be used when transmitting a first message during a random access procedure; and
   transmitting, by the first device using the first subcarrier spacing, the first message to a second device,
   wherein the determining, by a first device, a first subcarrier spacing to be used when transmitting a first message during a random access procedure comprises:
      determining a frequency band of a frequency domain resource to be used for transmitting the first message;
      determining a correspondence between a plurality of frequency bands and a plurality of subcarrier spacings; and
      determining the first subcarrier spacing according to the frequency band and the correspondence; and
   wherein the first message is a random access response message (MSG2) or a radio resource control (RRC) contention resolution message (MSG4).

2. The method according to claim 1, wherein the first message used for random access is a message transmitted during a 4-step random access procedure, or a message transmitted during a 2-step random access procedure.

3. The method according to claim 1, wherein the first device is an access network device, and the second device is a terminal device.

4. The method according to claim 3, wherein the determining, by a first device, a first subcarrier spacing to be used when transmitting a first message during a random access procedure further comprises:
   determining, by the first device, the first subcarrier spacing according to at least one of following information:
      pre-configured multiple subcarrier spacings;
      a random function;
      rank information of the terminal device;
      a quality value of a current link between the terminal device and the access network device;
      information on a location where the terminal device currently is;
      time required for performing the random access procedure;
      information on a service to be transmitted of the terminal device;
      a reason for triggering the random access procedure;
      a resource used when transmitting the first message;
      a subcarrier spacing supported by the terminal device;
      a frequency band supported by the terminal device;
      a random access mode used when performing the random access procedure;
      information for indicating a subcarrier spacing carried in a historical message prior to the first message; and
      a subcarrier spacing used by the historical message prior to the first message.

5. The method according to claim 4, wherein the determining, by the first device, the first subcarrier spacing comprises:
   selecting, by the first device, the first subcarrier spacing from the pre-configured multiple subcarrier spacings.

6. The method according to claim 4, wherein the determining, by the first device, the first subcarrier spacing comprises:
   acquiring, by the first device, a first probability value based on the random function; and
   determining, by the first device, the first subcarrier spacing according to a first correspondence and the first probability value, wherein the first correspondence is used to indicate a correspondence between at least one probability range and at least one subcarrier spacing.

7. The method according to claim 4, wherein the determining, by the first device, the first subcarrier spacing comprises:
acquiring, by the first device, a second probability value based on the random function; and
determining, by the first device, the first subcarrier spacing according to a second correspondence, the second probability value, and a rank indicated by the rank information of the terminal device, wherein the second correspondence is used to indicate a correspondence between at least one terminal device rank, at least one probability range, and at least one subcarrier spacing.

8. A device for random access, comprising a memory, a processor and a transceiver;
the memory is configured to store a program code;
the processor is configured to execute the program code stored in the memory and control the transceiver to communicate externally; and
when the program code is executed, the processor is configured to:
determine a first subcarrier spacing to be used when transmitting a first message during a random access procedure; and
control the transceiver to transmit, using the first subcarrier spacing, the first message to a second device,
wherein the processor is further configured to:
determine a frequency band of a frequency domain resource to be used for transmitting the first message;
determine a correspondence between a plurality of frequency bands and a plurality of subcarrier spacings; and
determine the first subcarrier spacing according to the frequency band and the correspondence; and
wherein the first message is a random access response message (MSG2) or a radio resource control (RRC) contention resolution message (MSG4).

9. The device according to claim 8, wherein the first message used for random access is a message transmitted during a 4-step random access procedure, or a message transmitted during a 2-step random access procedure.

10. The device according to claim 8, wherein the device is an access network device, and the second device is a terminal device.

11. The device according to claim 10, wherein the processor configured to determine a first subcarrier spacing to be used when transmitting a first message during a random access procedure is configured to:
determine the first subcarrier spacing according to at least one of following information:
pre-configured multiple subcarrier spacings;
a random function;
rank information of the terminal device;
a quality value of a current link between the terminal device and the access network device;
information on a location where the terminal device currently is;
time required for performing the random access procedure;
information on a service to be transmitted of the terminal device;

a reason for triggering the random access procedure;
a resource used when transmitting the first message;
a subcarrier spacing supported by the terminal device;
a frequency band supported by the terminal device;
a random access mode used when performing the random access procedure;
information for indicating a subcarrier spacing carried in a historical message prior to the first message; and
a subcarrier spacing used by the historical message prior to the first message.

12. The device according to claim 11, wherein the processor configured to determine the first subcarrier spacing is configured to:
select the first subcarrier spacing from the pre-configured multiple subcarrier spacings.

13. The device according to claim 11, wherein the processor configured to determine the first subcarrier spacing is configured to:
acquire a first probability value based on the random function; and
determine the first subcarrier spacing according to a first correspondence and the first probability value, wherein the first correspondence is used to indicate a correspondence between at least one probability range and at least one subcarrier spacing.

14. The device according to claim 11, wherein the processor configured to determine the first subcarrier spacing is configured to:
acquire a second probability value based on the random function; and
determine the first subcarrier spacing according to a second correspondence, the second probability value, and a rank indicated by the rank information of the terminal device, wherein the second correspondence is used to indicate a correspondence between at least one terminal device rank, at least one probability range, and at least one subcarrier spacing.

15. A non-transitory computer readable medium, storing a program code for execution by a terminal device or an access network device, the program code comprising instructions for:
determining, by a first device, a first subcarrier spacing to be used when transmitting a first message during a random access procedure; and
transmitting, by the first device using the first subcarrier spacing, the first message to a second device
wherein the determining, by a first device, a first subcarrier spacing to be used when transmitting a first message during a random access procedure comprises:
determining a frequency band of a frequency domain resource to be used for transmitting the first message;
determining a correspondence between a plurality of frequency bands and a plurality of subcarrier spacings; and
determining the first subcarrier spacing according to the frequency band and the correspondence; and
wherein the first message is a random access response message (MSG2) or a radio resource control (RRC) contention resolution message (MSG4).

* * * * *